July 21, 1970   A. C. DE GOEDEREN   3,521,542
REFLEX CAMERA WITH BUILT-IN EXPOSURE METER
Filed Oct. 26, 1966

INVENTOR.
ARIE CORNELIS DE GOEDEREN
BY
Emory L. Groff Jr.
Atty

United States Patent Office 3,521,542
Patented July 21, 1970

3,521,542
REFLEX CAMERA WITH BUILT-IN EXPOSURE METER
Arie Cornelis de Goederen, Burgemeester Elsenlaan 16, Rijswijk, Zuid Holland, Netherlands
Filed Oct. 26, 1966, Ser. No. 589,717
Claims priority, application Netherlands, Nov. 1, 1965, 6514120
Int. Cl. G03b *19/12*
U.S. Cl. 95—42                     8 Claims

ABSTRACT OF THE DISCLOSURE

A reflex camera with built-in exposure meter of the through-the-lens metering kind. A beam splitter plate is arranged to the rear of the reflex mirror, as seen from the objective, perpendicular to the optical axis of the beam of light forming the view-finder image. The surface of the plate remote from the reflex mirror is provided with a number of spaced tiny grooves. Highly reflective walls of the grooves serve to split off a fraction of the beam and to direct it sideways through the interior of the plate towards light sensitive means conjunct to at least one side edge of the plate.

---

The invention relates to reflex cameras with built-in exposure meters of the through-the-lens-metering kind. More particularly, the invention relates to reflex cameras in which the beam of light forming the viewfinder image passes through a transparent beam splitter plate arranged after the reflex mirror, as seen from the objective, and perpendicular to the optical axis of said beam, said plate containing a mirror system serving to split off a fraction of said beam and to direct said fraction sideways through the interior of said plate towards light sensitive means conjunct to the side edge or at least one of the side edges of said plate. Cameras of this kind are known, e.g. from Austrian Pat. No. 243,068, issued Oct. 25, 1965.

In cameras of the kind described in the said Austrian patent specification, it is desirable that the beam splitter plate be located so that the light to be sensed is split off the main beam as close as possible to the focusing plane. Otherwise, geometrically, the percentage of the beam that will reach the light sensitive means is not fully independent of the actual position and aperture of the diaphragm of the objective. It is also desirable that the beam splitter plate be located before the focusing plane in order to keep focusing aids such as ground glasses from influencing the readings and also to allow for easy interchangeability of such focusing aids.

In known cameras of the kind referred to, the beam splitter plate is of necessity so thick that these requirements cannot be satisfied adequately.

It is an object of the invention to provide a reflex camera of the kind described in which said beam splitter plate may be quite thin in comparison with the dimensions of its beam splitting area, so that it can be easily located close-by before the focusing plane, yet be capable of separating a considerable fraction off the beam forming the viewfinder image and of directing said fraction towards the light sensitive means.

A further object of the invention is to provide a camera of the kind described in which the light reaching the light sensitive means cannot possibly possess polarization characteristics differing from the polarization characteristics of the main beam.

A still further object of the invention is to provide a camera of the kind described in which the beam splitter plate is quite simple and easy to manufacture.

Another object of the invention is to provide a camera of the kind described in which the beam splitter plate, though having opaque areas, will not substantially affect the viewfinder image.

Still another object of the invention is to provide a camera of the kind described showing extremely low sensitivity to light entering through the opening for observing the viewfinder image.

According to the invention said mirror system comprises, as individual mirror elements, highly reflective walls of a number of spaced tiny grooves provided in that surface of the plate remote from the reflex mirror.

Other objects and features of the invention will become apparent as the following description proceeds with reference to the drawing, in which.

Figure 1:
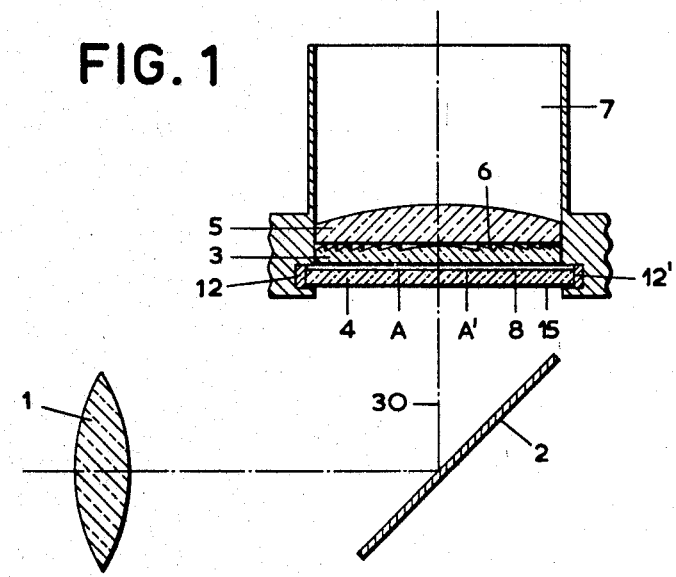
FIG. 1 is a section on the optical axis of the viewfinder system of a reflex camera according to the invention.
Figure 2:
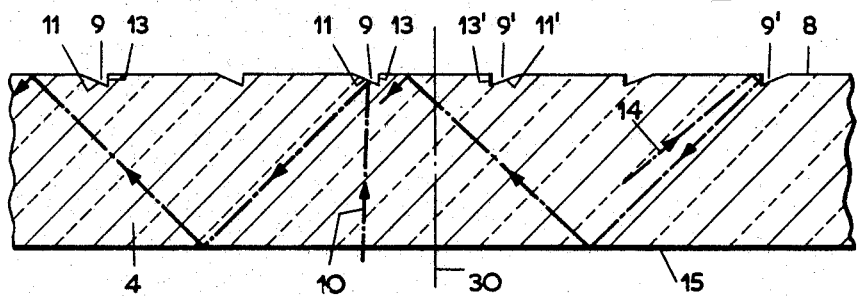
FIG. 2 shows a part of a beam splitting plate of FIG. 1 between the lines A and A', at a considerably enlarged scale, according to a preferred embodiment of the invention.

The viewfinder system of FIG. 1 comprises a viewfinder objective 1 (which, in single lens reflex cameras, also acts as the picture taking objective as well), a reflex mirror 2, a beam splitter plate 4, a Fresnel lens 3, a plano-convex lens 5 with a ground surface 6 onto which the viewfinder image is cast by the objective 1, and a viewfinder tube 7. Of the beam splitter plate 4, that surface 8 not facing the mirror 2 is provided with two groups of mutually spaced tiny grooves 9, 9', of triangular profile, the walls 11, 11', 13, 13' of which are made highly reflective, for instance by silvering, and of which the walls 11, 11' include such an angle, with the surface 8, that light coming from the mirror 2 and meeting the walls 11, 11' will be reflected so that it will, if subsequently meeting one of the surfaces 8, 15, be subject to total internal reflection and ultimately reach, if not interrupted by any obstacle, the light sensitive element 12 or 12' respectively.

There is a chance that, on its way to the light sensitive element 12, the ray 10 will be intercepted by one of the walls 13 of the grooves 9. Therefore, the angle between the walls 11 and the surface 8 is chosen as small as possible, whilst ensuring total reflection at the surfaces 8, 15 of practically all rays coming from the objective 1 and incident upon the walls 11, so that the grooves will be as shallow as possible as compared with their width. However, as an example, said angle may be about 22°, the thickness of plate 4 may be only 10% of the width of its beam splitting area, and the sum width of the grooves 9, 9' may be 15% of the width of said beam splitting area and, at the most, only about 20% of the light separated from the main beam by the middle ones of walls 11, 11' will then strike the walls 13, 13'. According to a preferred embodiment of the invention, the walls 13, 13' are highly reflective too and include angles $x$ slightly differing from 0° with the optical axis 30, so that rays 14 meeting the walls 13, 13' will be reflected in a direction differing just enough from the incident direction so as not to be reflected back, in the direction of the mirror 2, by the same wall 11, 11' by which they were originally split from the viewfinder beam; on the contrary, these rays have still an excellent chance of reaching one of the light sensitive elements 12', 12. Thus, even if a relatively high percentage of the viewfinder beam is split off and if the plate 4 is quite thin in comparison with the width of its beam splitting area, light incident upon peripheral grooves has practically no better chance of reaching one of the light sensitive elements than light incident upon the centrally disposed grooves, the loss of light intended to reach the light sensitive means being negligible.

Figure 3:
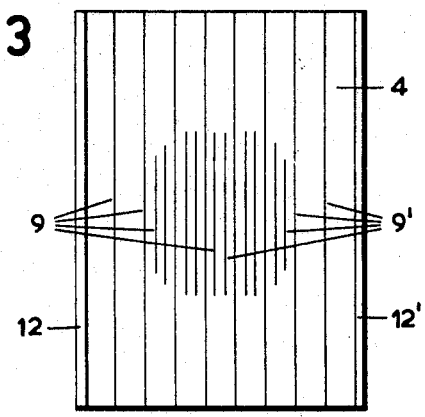
FIG. 3 is a plan view of the beam splitter plate according to said preferred embodiment.

By arranging the grooves 9, 9' so that their interspace is, at the central portion of the plate 4, smaller than at the periphery, the relative influence of the central portion of the image on the readings is increased. This may be desireable for obtaining optimally exposed pictures of quite different kinds of subjects. FIG 3 shows clearly how this can be acquired. The same effect could be obtained by choosing the width of the peripheral grooves smaller than the width of the centrally disposed grooves. Of course, if desired grooves may be present in the middle of the plate only so that the central portion of the image decides the readings, whereas in other cases, for instance in cameras with split image range finders, no grooves may be present at all just in the middle of the plate.

The reflective grooves need not necessarily be straight. They may be circular, elliptical etcetera. Finally, they may be formed as a single spiral groove, two or more concentric spiral grooves or any other figure. In these cases, there should be light sensitive means conjunct to all side edges of the beam splitter plate 4. The grooves may be discontinuous. The walls 11, 11' need not necessarily be parallel nor quite flat. The profiles of the grooves 9, 9' need not necessarily be exactly triangular as shown in the drawing, though, of course, a purely triangular profile is ideal.

In the embodiments shown in the drawing there are two groups of reflective grooves, 9 and 9', designed so that the walls 13 as well as the walls 13' are facing the centre of the plate 4 whereby light incident upon the walls 11 will reach the light senstiive element 12, and light incident upon the walls 11' will reach the light sensitive element 12'. Of course, within the scope of the invention, only one group covering the plate 4 partly or wholly may be present, only one edge of the plate 4 bearing a light sensitive element. The edge opposite to the edge bearing the light sensitive element may be then silvered.

The through-the-lens-metering system of the invention has very low sensitivity to light entering through the viewfinder 7. Practically, only light reflected by the surface 15 can possibly reach the light sensitive elements 12, 12'. By applying appropriate coating(s), the reflectiveness of surface 15 can be cut down to less than 1%. So the sensitivity to light entering through the viewfinder also becomes less than 1% of the sensitivity to light entering through the objective. As a result of its extremely low sensitivity to light entering through the viewfinder, the system of the invention is not limited in its use to cameras in which there is only a relatively small opening, usually fitted with an occular, for observing the image. For the same reason, the invention can very well find application in twin-lens reflex cameras as well as in single-lens reflex cameras.

Different from through-the-lens metering system using beam splitters incorporating semi-transparent layers, the system of the invention does not give rise to the possibility of obtaining incorrect readings should the beam of light forming the viewfinder image be polarized, which for instance, will be the case if a polarization filter is fitted to the objective. This is because the reflective grooves of the invention do not show, like semi-transparent layers, different reflectivity for the two planes of polarization when struck by rays not falling perpendicularly.

Although preferably the walls of the grooves according to the invention are made highly reflective by silvering or the like, their reflectivity for rays originating from the objective may also be caused otherwise, for instance by choosing the angle of the reflective surfaces so that at least substantially total internal reflection will take place.

Preferably, the grooves are 0.1–0.05 millimeter wide so that they will be scarcely or not at all visible in the viewfinder, dependent on the distance between the plate 4 and the focusing plane 6; on the aperture of the diaphragm of the objective, and on the light scattering capacity of the ground surface 6.

The beam splitter plate of the invention can be manufactured easily as follows: A glass or plastic plate is hot moulded in a mould, one half of which has a saw-shaped profile. Then, the corresponding side of the moulded plate is completely silvered. Next, the silvered side is ground down until the remaining silvered grooves have the required width. Lastly the plate is polished.

If the grooves 9, 9' are arranged perpendicular to the plane of the optical axis of the viewfinder, it is quite difficult to prevent light entering through the objective 1, but not incident upon the reflex mirror 2, from reaching the light sensitive element 12'. This difficulty is practically eliminated if, the grooves 9, 9' are arranged parallel to said plane (this alternative not being illustrated in the drawings).

It is deemed to be apparent that modifications may be made in the above described preferred embodiment of the invention without departing from the spirit of the invention. Therefore it is to be understood that the scope of the invention is to be determined solely from the appended claims.

I claim:

1. A reflex camera with a built-in exposure meter in which a beam of light forming the viewfinder image passes from an objective lens to a reflex mirror, a transparent beam splitter plate arranged after the reflex mirror and having two flat faces perpendicular to the optical axis of the light beam from the reflex mirror, the one of said two faces of said plate which is remote from the reflex mirror having a substantial part of its surface parallel with the other of said faces and including a plurality of mutually spaced tiny grooves, each said groove including a highly reflective wall splitting off a fraction of said beam entering said plate and directing said fraction sideways through the interior of said plate toward light sensitive means adjacent at least one side edge of said plate.

2. A reflex camera according to claim 1, wherein said grooves have substantially triangular profiles.

3. A reflex camera according to claim 2, wherein both walls of said grooves are highly reflective and one of said walls is substantially parallel to said optical axis.

4. A reflex camera according to claim 2, wherein both walls of said grooves are highly reflective and one of said walls includes an angle slightly differing from 0° with said optical axis.

5. A reflex camera according to claim 3, wherein said walls, which are substantially parallel to said optical axis, face the centre of said plate.

6. A reflex camera according to claim 1, wherein the interspace of said grooves at the middle of said plate is smaller than at the periphery.

7. A reflex camera according to claim 1, wherein said plate is located closely in advance of the focusing plane, as seen from the reflex mirror.

8. A reflex camera according to claim 1, wherein the width of said grooves nearer the periphery of the plate is smaller than the width of said grooves nearer the centre of the plate.

References Cited

UNITED STATES PATENTS 3,280,714  10/1966  Günther et al. _____ 95—42
3,327,600  6/1967  Trankner _____ 95—42

NORTON ANSHER, Primary Examiner

R. L. MOSES, Assistant Examiner

U.S. Cl. X.R.

95—10, 64